United States Patent [19]

Lautenschläger

[11] Patent Number: 5,767,493
[45] Date of Patent: Jun. 16, 1998

[54] HEATING CHAMBER WITH PRESSURE RESPONSIVE DOOR MOUNTING

[75] Inventor: Werner Lautenschläger, Leutkirch, Germany

[73] Assignee: Milestone Inc., Monroe, Conn.

[21] Appl. No.: 700,437

[22] PCT Filed: Jan. 5, 1995

[86] PCT No.: PCT/EP95/00046

§ 371 Date: Oct. 29, 1996

§ 102(e) Date: Oct. 29, 1996

[87] PCT Pub. No.: WO96/21075

PCT Pub. Date: Jul. 11, 1996

[51] Int. Cl.$^6$ .................................................. H05B 6/68
[52] U.S. Cl. .......................... 219/723; 219/702; 219/739; 219/686; 219/757
[58] Field of Search .................. 219/723, 722, 219/724, 739, 686, 702, 704, 757

[56] References Cited

U.S. PATENT DOCUMENTS

| | | | |
|---|---|---|---|
| 1,944,156 | 1/1934 | Feltham | 110/173 B |
| 2,620,509 | 12/1952 | Keating | 16/135 |
| 3,816,688 | 6/1974 | Fritts | 219/722 |
| 3,943,319 | 3/1976 | Hirai et al. | 219/722 |
| 4,327,241 | 4/1982 | Obenchain | 110/173 B |
| 4,454,686 | 6/1984 | Stapenell | 49/141 |
| 5,029,533 | 7/1991 | Hengelmolen | 110/181 |

FOREIGN PATENT DOCUMENTS

| | | | |
|---|---|---|---|
| 0145079A3 | 6/1985 | European Pat. Off. | |
| 4327381A1 | 2/1995 | Germany | |
| 59-35726 | 2/1984 | Japan | 219/739 |

Primary Examiner—Philip H. Leung
Attorney, Agent, or Firm—Fitzpatrick, Cella, Harper & Scinto

[57] ABSTRACT

In a device (1) for the treatment of materials under the action of heat, and if appropriate also pressure, in a heating chamber consisting of a housing (2), containing the heating chamber, having a charging opening for the heating chamber which can be selectively opened or closed by means of a door (4), and a heating device (6), in particular a microwave heating device, for the heating chamber (7), the door (4) is so mounted that when a particular pressure in the heating chamber is exceeded it lifts off from the door frame (2) and is movable into a relief-opening position, out of which position it is moveable back into the original-closed position—after reduction of pressure—either automatically or by the application of force.

19 Claims, 2 Drawing Sheets

HEATING CHAMBER WITH PRESSURE RESPONSIVE DOOR MOUNTING

BACKGROUND OF THE INVENTION

Field of the Invention

The invention relates to a device for the treatment of materials; and more particularly, it concerns a novel device having a heating chamber which is selectively opened and closed by a door.

DESCRIPTION OF THE RELATED ART

Devices of this kind are employed for initiating, promoting and/or carrying through chemical or physical processes in materials and/or for the preparation of materials in each case with relatively great heating and/or simply for the heating of materials for various purposes.

Thereby, there may be involved measures for separation of materials and/or preparation of materials in particular for the purpose of analysis and/or for the preparation of materials, e.g. heating or baking of foodstuffs for consumption.

With the above-described measures, because of the effect of the heat and evaporation of the material to be heated or of components of the material there is a pressure increase in the heating chamber which in particular in the case of a large volume heating chamber and a large area closure element can lead to an overloading and thus damaging of the parts retaining the closure element in its closure position. With a pressure increase in the heating chamber of only about 0.5 bar, there is in the case of a charging aperture of about 40 cm×40 cm a pressure loading of 800 kg on the inner surface of the closure element. Conventional mounting constructions for the closure element are not designed for such a loading. Such a design would also make more difficult the integration of the mounting elements and further lead to a disadvantageous and costly construction.

The above-described problems are present both when the material is treated in special closable sample containers or is treated directly in the heating chamber. In the first case, because of the pressure increase, there often occurs a bursting or exploding of the sample container or containers, whereby the pressure propagates into the heating chamber and places this likewise under pressure. In such devices or treatments in which the material to be treated is placed directly into the heating chamber, the latter is directly set under pressure.

The above-described problems occur with devices of the present kind in the case both of commercial use and also domestic use. An example of a domestically useable device is e.g. a domestic microwave oven which likewise suffers the above-described disadvantages and is also at risk for the above-mentioned reasons.

SUMMARY OF THE INVENTION

The object of the invention is to protect a device of the kind indicated in the introduction from an overloading resulting from a damaging internal pressure.

All solutions in accordance with the invention contribute to the protection of the device from overloading and thus contribute to a protection from explosions.

According to one aspect of this invention, there is provided a device for the treatment of materials under the action of heat, and if appropriate, also pressure, in a heating chamber. The device is formed with a charging aperture which opens into the heating chamber; and this aperture can be selectively opened and closed by means of a door which normally presses against a frame around the aperture. A heating device, such as a microwave generator, is provided for the heating chamber. The door is so mounted that upon a particular pressure in the heating chamber being exceeded, the door lifts off from the frame and moves to a relief-opened position; and, after the reduction of pressure, the door can be moved back into the original position either automatically or by the application of force.

With the above described configuration in accordance with the invention, an overpressure in the heating chamber is automatically released, so that overloading cannot arise. The door, standing in its relief position, can thereby fulfil a monitoring or indicating function from which it is apparent to the operating person that an overpressure was present.

Thereby, a maximum loading of the device or of the door can be limited by means of the force of a spring which biases the door into its closed position. In the case of an internal pressure exceeding the thereby predetermined pressure parameter, the door is moved against the biasing force of the spring, whereby an opening gap appears through which the pressure can escape, whereby the overloading is prevented. With such a configuration working can take place with an overpressure in the heating chamber which is lesser than the bias force.

According to a specific embodiment of the invention, the housing has a set of perforations, whereby an overpressure is prevented from arising, since the overpressure can escape through the perforations. This configuration in accordance with the invention is suitable for measures for the heat treatment of materials which take place at normal pressure or room pressure and/or at an under-pressure in the heating chamber.

According to a further specific embodiment of the invention, a pressure sensor is associated with the heating chamber which together with a control or regulation device reduces or so controls the heating power that a particular internal temperature is not exceeded or the heating is turned off. In all these cases, the internal temperature is limited or reduced so that through these means a damaging or dangerous increase in the internal pressure is avoided. This configuration in accordance with the invention is suitable in particular for combination with the configuration in accordance with the invention in particular when the heating device is a microwave heating device. With such a combination, the movable closure element may be the pressure sensitive part of the pressure sensor which brings about a switching off of the microwave power. By these means, not only is the temperature in the chamber reduced but it is also prevented that microwaves escape to the outside through the gap formed upon movement of the closure element between the latter and the housing.

Additional specific features of the invention as embodied herein involve features which improve the functions of the device or the mounting of the closure element and provide for simple, compact and economically manufacturable constructions which also make possible a purposive treatment and special treatments of the material.

BRIEF DESCRIPTION OF THE DRAWINGS

Below, the invention and further advantages which can be achieved thereby will be described in more detail with reference to preferred exemplary embodiments as shown in the accompanying drawings in which.

DETAILED DESCRIPTION OF THE PREFERRED EMBODIMENT

Figure 1:
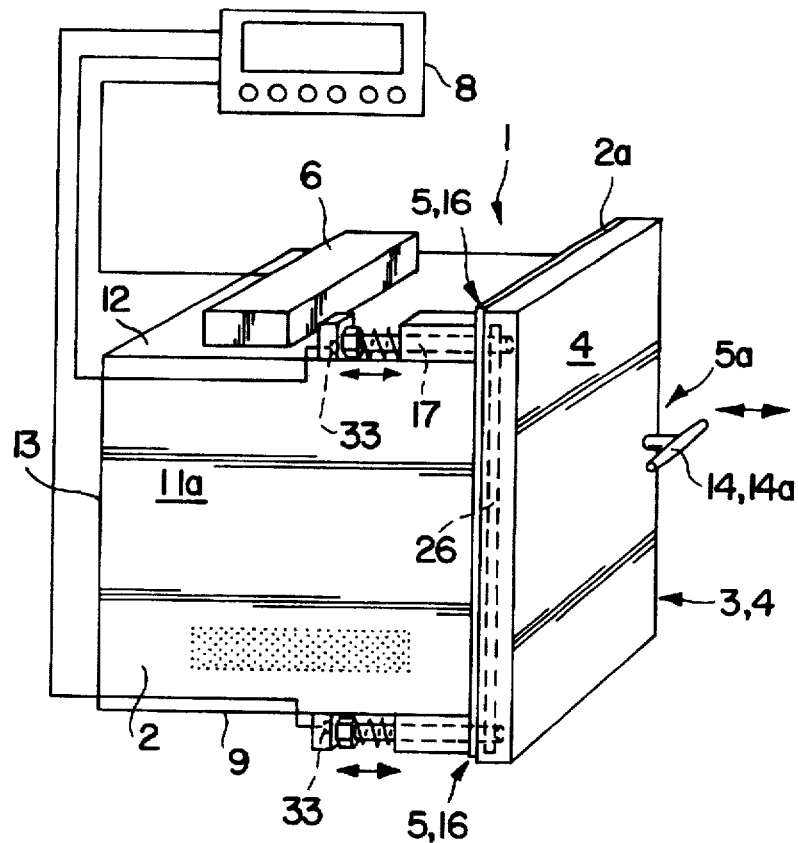
FIG. 1 is a perspective view showing a device in accordance with the invention and, in particular, showing a door in a first position.
Figure 5:
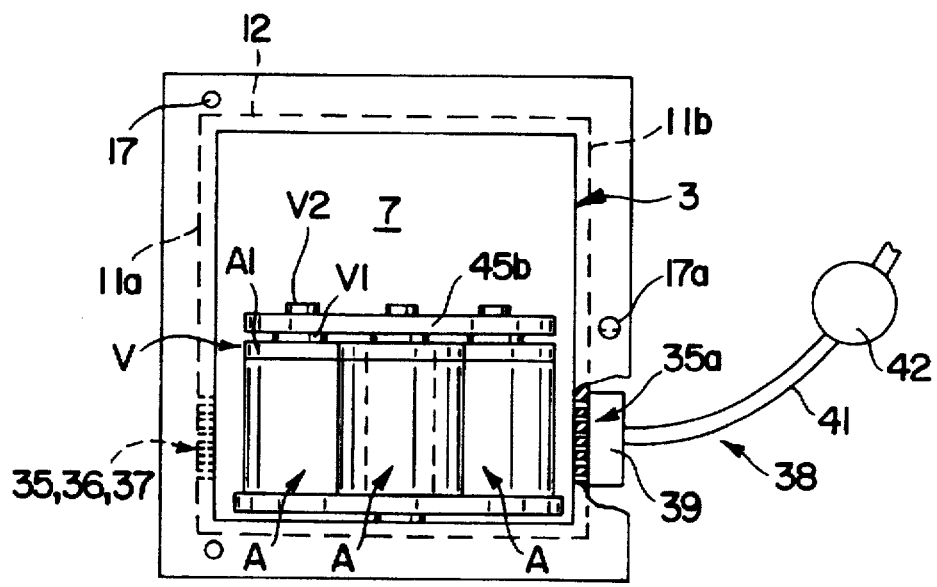
FIG. 5 is a front elevational view, partially cut away, of a housing for the device of FIG. 1, with the door removed.

Referring first to FIGS. 1 and 5, a device 1 according to the present invention, comprises; a block-like housing 2 having a front charging aperture 3 (FIG. 5) which can be selectively opened or closed by means of a swing door 4, elastically yielding mounts 5 for the swing door 4, a heating device 6, in particular a microwave heating device, for heating a heating chamber 7 arranged in the housing 2, and an electrical control and/or regulation device 8 which is connected with the associated control or regulation elements of the device 1 by means of control or signal lines and is equipped with automatically functioning control and regulation elements and, if appropriate, with a keyboard for manual setting.

The housing 2 is of block-like form and has a floor wall 9, two side walls 11a, 11b, a ceiling wall 12 and a rear wall 13, whereby the front wall is formed by means of the swing door 4 and closes the front charging aperture 3 in its closed position.

As shown in FIG. 1, there is provided a heating device 6. The heating device 6 has a magnetron, which may be arranged e.g. over an opening on the ceiling wall 12 (not shown) and through which the microwaves are coupled into the heating chamber 7. The housing 2 is of metal, whereby the swing door 4 may also be partly of transparent material, e.g. glass. In this case it is however prevented, by measures known per se (metal grids), that microwaves can emerge through the glass.

Figure 4:
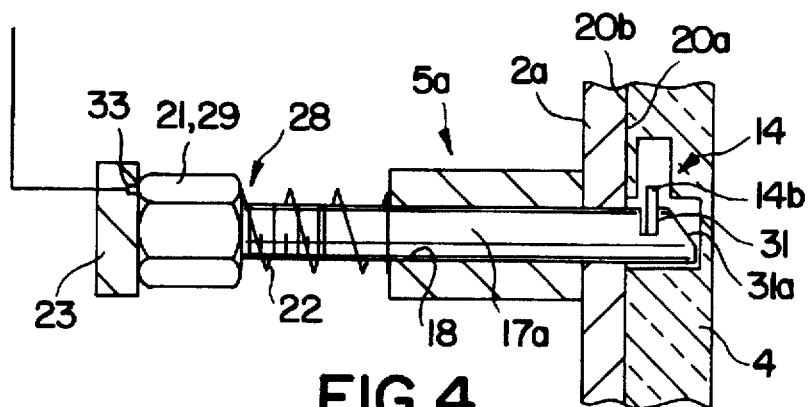
FIG. 4 is a fragmentary section view showing a door locking arrangement for the device of FIG. 1.

In the present configuration, the swing door 4 is mounted swingably by means of two yielding joint mounts 5, arranged at the upper and lower corner regions, respectively, at one side; and the door 4 is closable by means of a locking device 14 arranged on the other side. The locking device 14 has an externally accessible handle 14a and a vertically movable key bolt 14b (shown in FIG. 4) connected therewith in conventional manner. The overall two yielding joint mounts 5 is essentially the same, except that they are arranged in a mirror-image manner with regard to a horizontal middle plane. For purposes of simplicity, therefore, only the upper yielding joint mount 5 will be described.

The joint 16 of the yielding joint mount 5 consists of a joint part associated with the housing 2 in the form of a joint bar 17 preferably circular in cross-section which extends at right angles to the plane of the door 4 and which is guided and mounted in a guide hole 18 of a mounting piece 19 displaceably along its middle axis, i.e. likewise at right angles to the plane of the door. The joint bar 17 penetrates the mounting piece 19 and projects beyond it to the rear, whereby a compression spring 22 is spanned between a thickened bar head 21 and the mounting piece 19, which (biases) the joint bar 17 to the rear against a stop 23 which may advantageously be formed by means of a stop piece attached on the housing 2 behind the bar head, here on the ceiling wall 12 of the housing.

Figure 3:
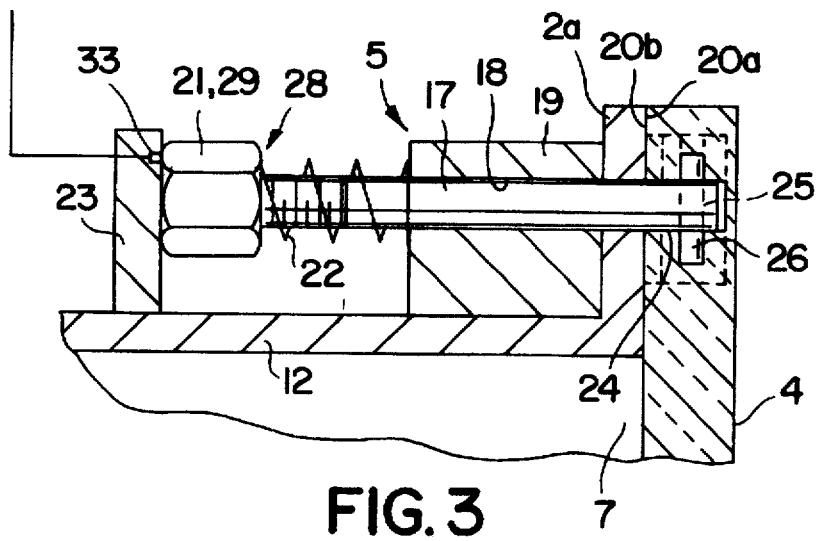
FIG. 3 is a fragmentary section view showing one form of door mounting arrangement for the embodiment of FIG. 1.

The joint bar 17 extends forwardly beyond the plane of the charging aperture 3 (FIG. 5) and engages into a horizontal joint recess 24 (FIG. 3) of the swing door 4, with play for movement. Within the swing door 4, the joint bar 17 has a vertical joint bore 25 in which a joint pin 26 is mounted with play for movement, which joint pin is held on the swing door 4. The joint recess 24 is so large horizontally that the swing door 4 can be swung more than 90°, whereby the door is mounted with the horizontal limiting walls of the joint recess 24 on the two joint bars 17 present. The stop or stops 23 are so positioned that with abutment of the bar head or heads 21 due to the biasing of the spring 22, the swing door 4 abuts with its abutment surface 20a on the abutment surfaces 20b surrounding the charging aperture 3, if appropriate by means of a seal (not shown) and thereby closes the heating chamber 7. The latter abutment surface 20b may also be arranged on a flange 2a surrounding the charging aperture 3.

Preferably the yielding joint mount 5 is integrated in an adjustment device designated generally with 28 which makes possible an adjustment and setting of the swing door 4 at right angles to its plane, in order to adapt the door to the abutment surface 20b taking into consideration the tolerances present. With the present configuration, the adjustment device 28 is formed by means of a telescopable joint rod 17 whereby its rear end region has a thread onto which there is screwed a threaded nut 29—preferably lockably on the thread—which slightly projects beyond the rear end of the joint rod 17 and is thus suitable for length setting. A yielding mount 5a is provided in the region of the locking device 14 is formed in substance the same as the yielding mount 5 in the region of the joint 16—see the same parts with the same reference numbers—whereby however instead of a joint 16 at the forward end of the locking bar 17a there is provided a locking recess 31, if appropriate with an approach slant 31a of the thus formed locking part. The locking bar 17a is adjustable in the same manner as the joint bar 17. There is to be associated with the locking bar 17a, so far as it is circular, a means preventing rotation thereof, since it is not secured against rotation as is the joint bar 17 by means of the joint pin 26 in the door.

With the above-described configuration, the yielding joint mounts are arranged on the ceiling wall 12 or under the floor wall 9 and attached thereto, and the yielding locking device 14 is mounted on the outside on the associated side wall 11b. Within the scope of the invention, however, other arrangements are possible, e.g. the two joint mounts 5 may be mounted on the inside or the outside on the associated side wall 11a or integrated therein.

Within the scope of the invention it is possible to correspondingly retain and mount a lid (not shown) or a swing door arranged on the upper side (not shown).

Figure 2:
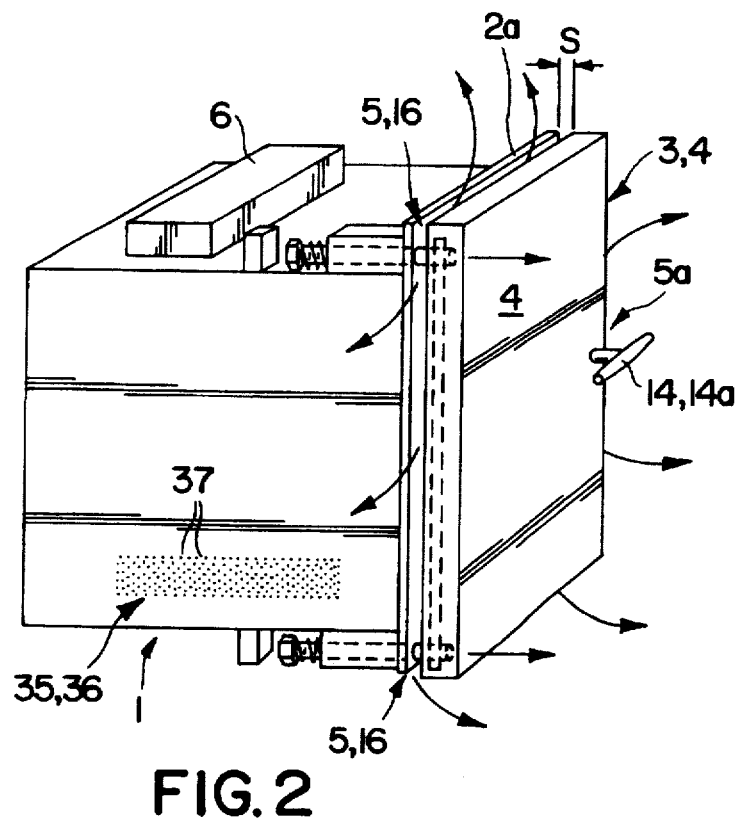
FIG. 2 is a view similar to FIG. 1 but showing the door in a second position; is a view similar to FIG. 1 but showing the door in a second position.

For a heat treatment process of a material this is placed, preferably in at least one receptacle A (FIG. 5), in the heating chamber 7 and the heating device switched on, whereby the material is heated by means of the microwaves directly or also indirectly, as is known per se. Vapours thereby appearing, and temperature and/or pressure rises connected therewith, can increase to such a level in the heating chamber 7 that the compression springs 22—dimensioned in accordance with a particular pressure value and exercising a corresponding bias—are overcome and the swing door 4 lifted off from the abutment surface 20b. Hereby, there arises a gap S illustrated in FIG. 2, through which an overpressure exceeding a predetermined pressure value can escape to the outside. By these means, the loading of the spring door 4 and its mounting and locking means is limited to a value so that these parts, with regard to their strength, need only be made so robust that they can accept the demands at the predetermined pressure value. This applies naturally also for the housing 2, because a higher internal pressure cannot arise.

It is also advantageous to associate with the heating chamber 7 a pressure sensor which monitors the internal pressure and at an internal pressure which may be equal to the predetermined pressure value or may also correspond to a lesser pressure value, switches off the heating device 6 and in particular a microwave heating device, so that no microwaves can escape to the outside through the gap S.

The gap S preferably in the range of 1 to 5 mm.

An above-mentioned pressure sensor may in advantageous manner monitor the position of the swing door or components mounted on the same; and, in the event of a movement, the pressure sensor may deliver a signal to the control device 8 (FIG. 1). With the present configuration, two pressure sensors are formed by means of switches or microswitches 33 which are preferably arranged between the stop pieces 23—in particular therein or thereon built-in or built-on—and the rearward ends of the joint rods 17 and deliver a signal upon lifting off of the swing door 4.

The parts of the yielding joint mount 5 and locking mount 5a may be of metal.

As shown in FIG. 5, with the above-described exemplary embodiments, instead of or in addition to the elastically yielding door mount, there may be provided in a wall or in one or in both side walls 11a, 11b, a set of perforations 35 in a part region 36 of the associated wall. The part region 36 is located preferably in the lower region of the housing. The set of perforations comprises a plurality of holes 37 the cross-sectional size of which is so large—taking into consideration the wall thickness and the wavelength of the microwaves—that no microwaves emerge from the holes 37. In the present configuration, circular holes are provided, the cross-sectional size or diameter of which is 2 to 4 mm. The thickness of the side wall 11a and also 11b may thereby be about 1 mm.

The number of the holes 37 is such that, in the case of a spontaneous pressure increase to be expected, the pressure can escape through the holes 37 without the device 1 suffering damage or exceeding a particular pressure value. With this configuration, a treatment of the material in the heating chamber 7 is in substance possible only at normal or room pressure.

The perforations 35 are, however, also suitable advantageously in combination with an elastically yieldingly held swing door 4 when the perforations are only so large that despite the perforations there can arise in the heating chamber 7 a pressure exceeding the predetermined pressure value which brings about the abovedescribed lifting off of the door.

The perforations 35 may also be a part of a ventilation system 38 for heating chamber 7. In this case, there is provided at another location of the housing 2, preferably an opposite location, e.g. in the other side wall 11b, a second set of perforations 35a in a corresponding manner, whereby one of the sets of perforations—here the perforations 35a—is provided at a suction or pressure device for air or a gas, e.g. an inert gas. In accordance with FIG. 5, the perforations 35a are connected by means of a collector 39 and a connected pipe or tube line 41 with a pump 42 which transports the air or a gas from a gas source through the heating chamber 7 by suction or pressurisation. Here, a cooling and/or flushing device for the heating chamber 7 may be involved. In particular in the case of a flushing device for transporting away vapours out of the heating chamber 7 it is advantageous to connect the discharge line to a chimney or to a device for analyzing the vapours.

With the configuration according to FIG. 5, one or more receptacles A may be provided which are each sealingly closable by means of a receptacle lid A1 and with each of which an over-pressure valve V is associated which opens at a receptacle pressure exceeding a predetermined value. Preferably, the associated valve body is the receptacle lid A1 itself which is biased into its closed position by means of a spring element V1, e.g. by means of a settable pressure part, preferably in the form of a setting screw V2.

With the configuration according to FIG. 5, there is provided a carousel 45 having a carrier disk 45a and a cover disk 45b, rotatable or swingable to and fro by means of a drive (not shown), whereby the setting screws V2 are vertically screwed into and preferably accessible from above the cover disk 45b. The receptacles A, with the spring element V1 preferably arranged thereon, are mounted between the setting screws V2 and the current disk 45a.

I claim:

1. Device for the treatment of materials under the action of heat and pressure, in a heating chamber, said device comprising a housing containing a heating chamber, said housing being formed with a charging aperture for the heating chamber, said aperture being surrounded by a door frame on said housing, a pivotal door which can be moved to selectively open and close said aperture, and a microwave heating device for the heating chamber, characterized in that:

the device also includes a first mounting structure which mounts said frame to said housing and a second mounting structure which mounts said door to said frame, one of said mounting structures including a releasable locking device and allowing pivotal movement when the locking device is released, and the other mounting structure including a pressure responsive holding device which permits limited linear movement in response to excessive pressure within the chamber.

2. Device according to claim 1, characterized in that, in the relief-opened position there is a gap between the door frame and the door.

3. Device according to claim 1 or 2, characterized in that, the door is elastically biased into its closed position and is movable transversely of the opening surface of the charging aperture.

4. Device claim 1, characterized in that, the door is a swing-lid.

5. Device claim 1, characterized in that, the door is arranged at a side of the housing (2).

6. Device according to claim 1, characterized in that, the housing in vertical cross-section has a right-angled or quadratic form and the door likewise has a right-angled or quadratic form.

7. Device according to claim 1, characterized in that, the door is pivotably mounted at one side by means of at least one pivot joint and has at the other side, a locking device.

8. Device according to claim 7, characterized in that, a elastically yielding mount is integrated into at least one of the pivot joint and the locking device of the door.

9. Device according to claim 7, characterized in that, one of said joint and locking parts is mounted to be displaceable transversely of the opening surface of the charging aperture and is biased inwardly.

10. Device according to claim 9, characterized in that, at least one of the joint and a locking part associated with the housing is formed by means of a bar extending at right angles to the door, which bar is mounted to be longitudinally displaceable along its middle axis in a guide hole of a mounting piece, and in that the door is pivotally mounted on the door end of the bar.

11. Device according to claim 10, characterized in that, the joint bar is biased inwardly against a stop by means of a spring.

12. Device according to claim 11, characterized in that, a switch is associated with the stop, which, switch delivers to the associated control device a signal for switching off the heating device.

13. Device according to claim 1, characterized in that, the door is mounted to be displaceable from said aperture in at least one of several directions which include movement in parallel to itself and swingable and tiltable movement.

14. Device according claim 1, characterized in that, there is provided an adjustment device for adjustment of the movable joint part transversely of the opening surface of the charging aperture.

15. Device according to claim 14, characterized in that, the joint bar is telescopable, by means of a threaded nut screwed onto its rearward end or a screwed-in screw.

16. Device according to claim 1 wherein the housing has, in a wall thereof, a set of perforations which are so dimensioned in relation to the thickness of said wall that no microwaves emerge through said perforations.

17. Device according to claim 16, characterized in that, there are provided respective sets of perforations in at least two walls of the housing, and there is provided for one set of perforations a ventilation device for a gas for the heating chamber.

18. Device for the treatment of materials in accordance with claim 1, characterized in that, a pressure sensor is associated with the heating chamber, and a control or regulation device is associated with the pressure sensor, which control or regulation device so controls the heating power of the microwave heating device when a particular pressure value in the heating chamber is exceeded that the pressure in said heating chamber does not exceed a predetermined pressure value.

19. Device according to claim 18, characterized in that, the pressure sensor detects the movement of the door for the purpose of generating a control signal for the control or regulation of the heating power.

* * * * *